US 6,737,778 B2

(12) United States Patent
Daikoku et al.

(10) Patent No.: US 6,737,778 B2
(45) Date of Patent: May 18, 2004

(54) PULLEY DRIVING SYSTEM

(75) Inventors: Akihiro Daikoku, Tokyo (JP); Naoki Hashiguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 54 days.

(21) Appl. No.: 09/951,461

(22) Filed: Sep. 14, 2001

(65) Prior Publication Data
US 2002/0113511 A1 Aug. 22, 2002

(30) Foreign Application Priority Data

Dec. 27, 2000 (JP) .......................... 2000-396403
Mar. 29, 2001 (JP) .......................... 2001-094778

(51) Int. Cl.⁷ .................. G02K 16/00; H02K 21/24; H02K 1/27
(52) U.S. Cl. .................. 310/112; 310/51; 310/156.47; 310/254; 318/51
(58) Field of Search .................. 310/112, 114, 310/51, 268, 254, 156.32–36, 156.47, 218, 259; 318/34, 51, 53, 112

(56) References Cited

U.S. PATENT DOCUMENTS

| 2,857,534 A | * | 10/1958 | Beach .......................... 310/74 |
| 4,270,063 A | * | 5/1981 | Dochterman .................. 310/66 |
| 4,423,359 A | * | 12/1983 | Hashimoto ..................... 318/6 |
| 5,289,069 A | * | 2/1994 | Hasegawa et al. ........... 310/156 |
| 5,528,094 A | * | 6/1996 | Hasebe et al. ............... 310/112 |
| 5,838,085 A | | 11/1998 | Roesel, Jr. et al. | |
| 5,942,873 A | * | 8/1999 | Nakano ....................... 318/702 |
| 6,049,153 A | * | 4/2000 | Nishiyama et al. ......... 310/156 |
| 6,437,529 B1 | * | 8/2002 | Brown ........................ 318/439 |

FOREIGN PATENT DOCUMENTS

| EP | 497 317 | | 8/1992 | |
| JP | 58-222766 | * | 12/1983 | .......... H02K/21/08 |
| JP | 4299038 | | 10/1992 | |
| JP | 05-227727 | * | 9/1993 | ......... H02K/41/025 |
| JP | 2000-116082 | | 4/2000 | |
| WO | WO93/17484 | * | 9/1993 | .......... H02K/5/128 |
| WO | WO 98/32684 A1 | | 7/1998 | |
| WO | WO 98/32685 A1 | | 7/1998 | |
| WO | WO 98/32686 A1 | | 7/1998 | |
| WO | WO 98/32687 A1 | | 7/1998 | |

OTHER PUBLICATIONS

Hakala, Harri; "Integration of Motor and Hoisting Machine Changes the Elevator Business", *ICEM 2000*, pp. 1242–1245, Aug. 28–30, 2000.
Abstract Only JP 4–97459, Aug. 24, 1992.

* cited by examiner

*Primary Examiner*—Karl Tamai
(74) *Attorney, Agent, or Firm*—Leydig, Voit & Mayer, Ltd.

(57) ABSTRACT

A rotary electromechanical device includes a first motor including a first stator and a first rotor, a second motor including a second stator and a second rotor, and variable power supplies for driving the respective motors independently of each other, The motors are arranged in series along the axial direction of a rotary shaft. Magnetic poles of the same polarity of the rotors are located at uniform angular positions around the rotary shaft while magnetic poles of the stator of the motor and magnetic poles of the stator of the second motor are displaced from each other in the circumferential direction of the rotary shaft.

11 Claims, 10 Drawing Sheets

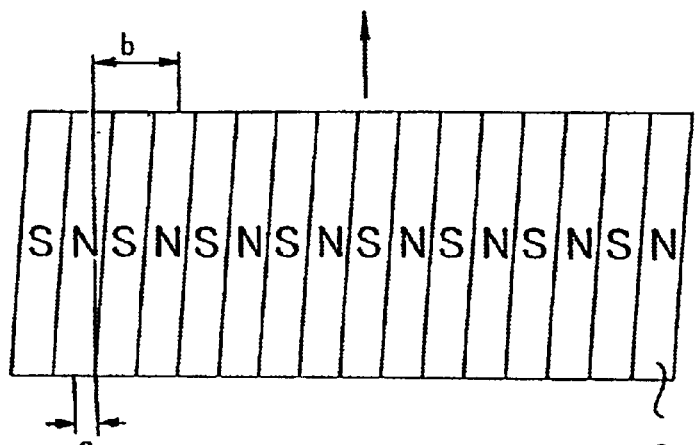
FIG. 14A
non-skew structure        skew structure
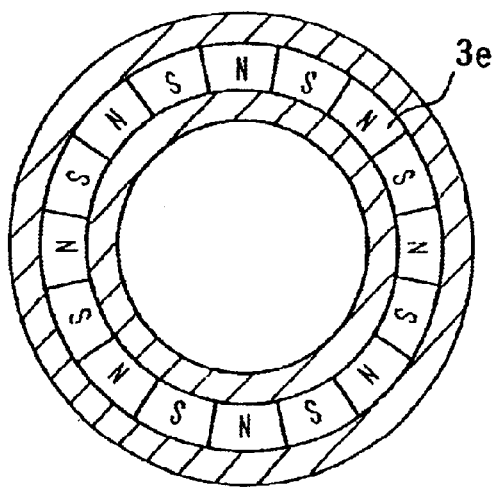 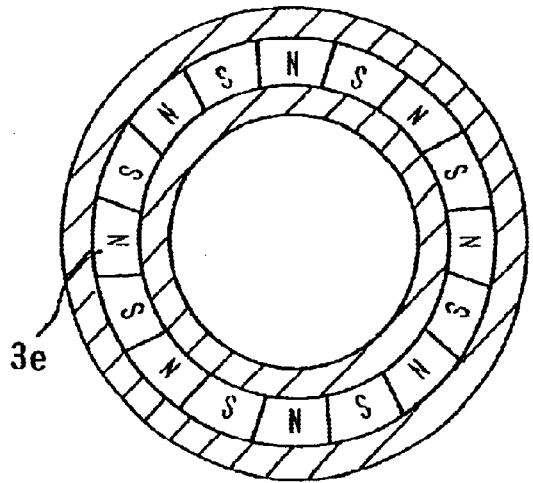
FIG. 14B
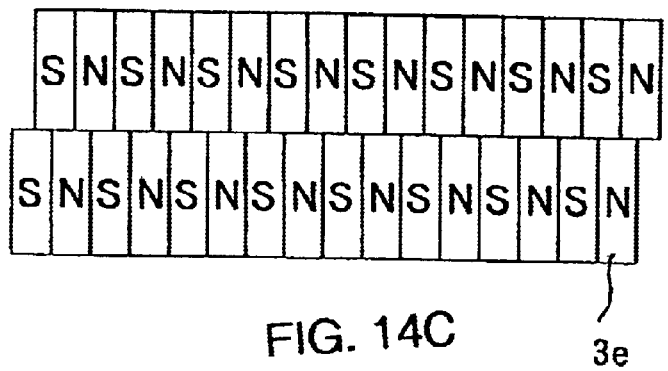
FIG. 14C

PULLEY DRIVING SYSTEM

BACKGROUND OF THE INVENTION AND RELATED ART STATEMENT

The present invention relates to a rotary electromechanical device used in a field in which stringent requirements are imposed with respect to torque characteristics and for small torque ripples, as well as to a pulley driving system using the rotary electromechanical device.

In a rotary electromechanical device like an induction motor, for example, grooves, or so-called slots, for accommodating coils are formed in the proximity of an air gap by punching an iron core in a stator or a rotor, and there occur areas of high and low magnetic flux densities in a magnetic field formed in the air gap due to a difference in reluctance between the slots and the iron core. For this reason, magnetic fluxes formed in the air gap contain a lot of harmonic components and, therefore, there occur torque variations in the induction motor. The torque variations occurring in the induction motor are referred to as torque ripples, and it is necessary to solve this torque ripple problem.

Conventionally, so-called skewed slots, which are the slots formed in the stator or the rotor at an oblique angle to the direction of an axis of rotation, have been employed to solve this problem. Another approach to the solution of the problem is disclosed in Japanese Laid-open Utility Model Publication No. 4-97459, in which a rotary electromechanical device comprises a plurality of stators which share a single rotor and the positions of slots formed in the multiple stators are displaced from one another in the direction of rotation, or a rotary electromechanical device comprises a plurality of rotors which share a single stator and the positions of slots formed in the multiple rotors are displaced from one another in the direction of rotation, and coils accommodated in the slots are connected in series.

Stringent requirements are imposed on a rotary electromechanical device used in an elevator, for example, for small torque ripple as well as concerning the amount of torque. The rotary electromechanical device employing the aforementioned skewed slots and the rotary electromechanical device disclosed in Japanese Laid-open Utility Model Publication No. 4-97459, however, has a problem that it is difficult to obtain the amount of torque satisfying the aforementioned requirements due to a reduction in facing surface areas of magnetic poles of the rotors and magnetic poles of the stators.

In particular, a so-called magnetic pole concentrated winding type rotary electromechanical device, in which coils are wound closely around teeth formed on a core of a stator, has a problem that a reduction in the amount of torque increases if a conventional torque ripple reduction method as stated above is used.

SUMMARY OF THE INVENTION

The invention has been made to solve the to aforementioned problems and, thus, it is an object of the invention to provide a rotary electromechanical device which can prevent a reduction in the amount of torque and reduce torque ripples as well as a pulley driving system employing such a rotary electromechanical device.

According to the invention, a rotary electromechanical device comprises a rotary shaft, a plurality of motor sections, each including a rotor and a stator positioned to face each other, the rotors of the individual motor sections being fixedly mounted in series on the rotary shaft, and power supplies for driving the multiple motor sections independently of one another, wherein the relative distance between magnetic poles of the same polarity on the rotor and the stator in the circumferential direction of the rotary shaft differs between the individual motor sections. This construction makes it possible to provide a high-performance rotary electromechanical device capable of suppressing torque ripples without reducing the amount of torque.

In one form of the invention, the multiple motor sections are two motor sections driven by the respective power supplies of a three-phase alternating current type, and the difference between the relative distances between the motor sections corresponds to a phase difference equal to an odd multiple of 90° in terms of electrical angle. This arrangement is advantageous in that it can cancel out two types of torque ripples, that is, the torque ripples (whose frequency is six times the power supply frequency) occurring due to harmonic magnetic fluxes and the torque ripples (whose frequency is twice the power supply frequency) occurring due to manufacturing errors of the stators (deformation of surfaces facing the rotors).

In another form of the invention, the stators are of a magnetic pole concentrated winding type in which coils are wound closely around individual teeth formed on stator cores of the individual stators. Compared to the conventional concentrated winding type motors whose torque is noticeably decreased due to the torque ripple reduction method, the aforementioned arrangement of the invention can suppress the torque ripples without reducing the amount of torque. In addition, the arrangement of the invention helps improve productivity.

In still another form of the invention, the teeth formed on each of the stator cores are separated from one another or the teeth are joined in such a manner that intervals between winding portions of the adjacent teeth on which coils are wound can be increased. This arrangement is advantageous in improving the efficiency of wire-winding operation.

In yet another form of the invention, the motor sections are of a radial gap type in which facing surfaces of the stators and the rotors are arranged parallel to the axial direction of the rotary shaft. This arrangement is advantageous in that it can cancel out electromagnetic forces exerted between the stators and the rotors, reduce forces exerted on a bearing and prolong its service life.

In another form of the invention, the motor sections are of an axial gap type in which facing surfaces of the stators and the rotors are arranged at right angles to the axial direction of the rotary shaft. This arrangement mares it possible to obtain a greater mechanical accuracy of the facing surfaces of the stators and the rotors and reduce torque ripples occurring in relation to manufacturing errors.

In one variation of the aforementioned radial gap type arrangement, the magnetic poles provided on the stators or the magnetic poles provided on the rotors, or the magnetic poles provided on both the stators and the rotors, are arranged at an oblique angle to the axial direction of the rotary shaft. This arrangement makes it possible to reduce the torque ripples in a more reliable fashion. In addition, it is made possible to cancel out torque ripples related to various components of the power supply frequency as well as components other than the power supply frequency when such components occur.

In one variation of the aforementioned axial gap type arrangement, the magnetic poles provided on the stators or the magnetic poles provided on the rotors, or the magnetic poles provided on both the stators and the rotors, are arranged at an oblique angle to the radial direction of rotary shaft. This arrangement also makes it possible to reduce the torque ripples in a more reliable fashion. In addition, it is made possible to cancel out torque ripples related to various components of the power supply frequency as well as components other than the power supply frequency when such components occur.

According to the invention, a pulley driving system comprises a rotary shaft, a plurality of motor sections, each including a rotor and a stator positioned to face each other, the rotors of the individual motor sections being fixedly mounted in series on the rotary shaft, a pulley section arranged in series with the rotors in the axial direction of the rotary shaft and fixedly mounted on the rotary shaft, and power supplies for driving the multiple motor sections independently of one another, wherein the relative distance between magnetic poles of the same polarity on the rotor and the stator in the circumferential direction of the rotary shaft differs between the individual motor sections. This construction makes it possible to provide a high-performance pulley driving system capable of suppressing torque ripples without reducing the amount of torque.

In one form of the invention, iron cores of the individual rotors and the pulley section are formed into a single structure. This construction makes it possible to increase the rigidity of individual joints and exactly invert the phases of the torque ripples, so that the torque ripples can be suppressed in a reliable fashion.

In another form of the invention, the whole of the multiple motor sections are provided on one side of the pulley section in the axial direction of the rotary shaft. This arrangement makes it possible to assemble individual elements from one side of the system, resulting in an improvement in productivity. In addition, since the distance between the motor sections is reduced, the rigidity of a portion between them increases and alignment of the phases of the torque ripples becomes even easier. Furthermore, it is possible to effectively use internal spaces of the stators in the case of motors having a large diameter.

In still another form of the invention, the multiple motor sections are provided on both sides of the pulley section in the axial direction of the rotary shaft. This arrangement makes it possible to balance forces exerted on the pulley section and distribute forces exerted on the pulley section and the motor sections and, therefore, there is no need to unnecessarily increase the mechanical strength of connecting parts between the pulley section and the motor sections and the physical size of the system can be reduced.

These and other objects, features and advantages of the invention will become more apparent upon reading the following detailed description in conjunction with the accompanying drawings.

BRIEF DESCRIPTION OF THE DRAWINGS

FIG. 14A is a development plan of permanent magnets in a motor free of skew, FIG. 14B is an end view of permanent magnets in a motor that includes skew, and FIG. 14C is a view of permanent magnets in a motor arranged in offset layers, all according to the invention.

DETAILED DESCRIPTION OF THE PREFERRED EMBODIMENTS OF THE INVENTION

First Embodiment

Now, embodiments of the invention are described with reference to the accompanying drawings.

Figure 1:
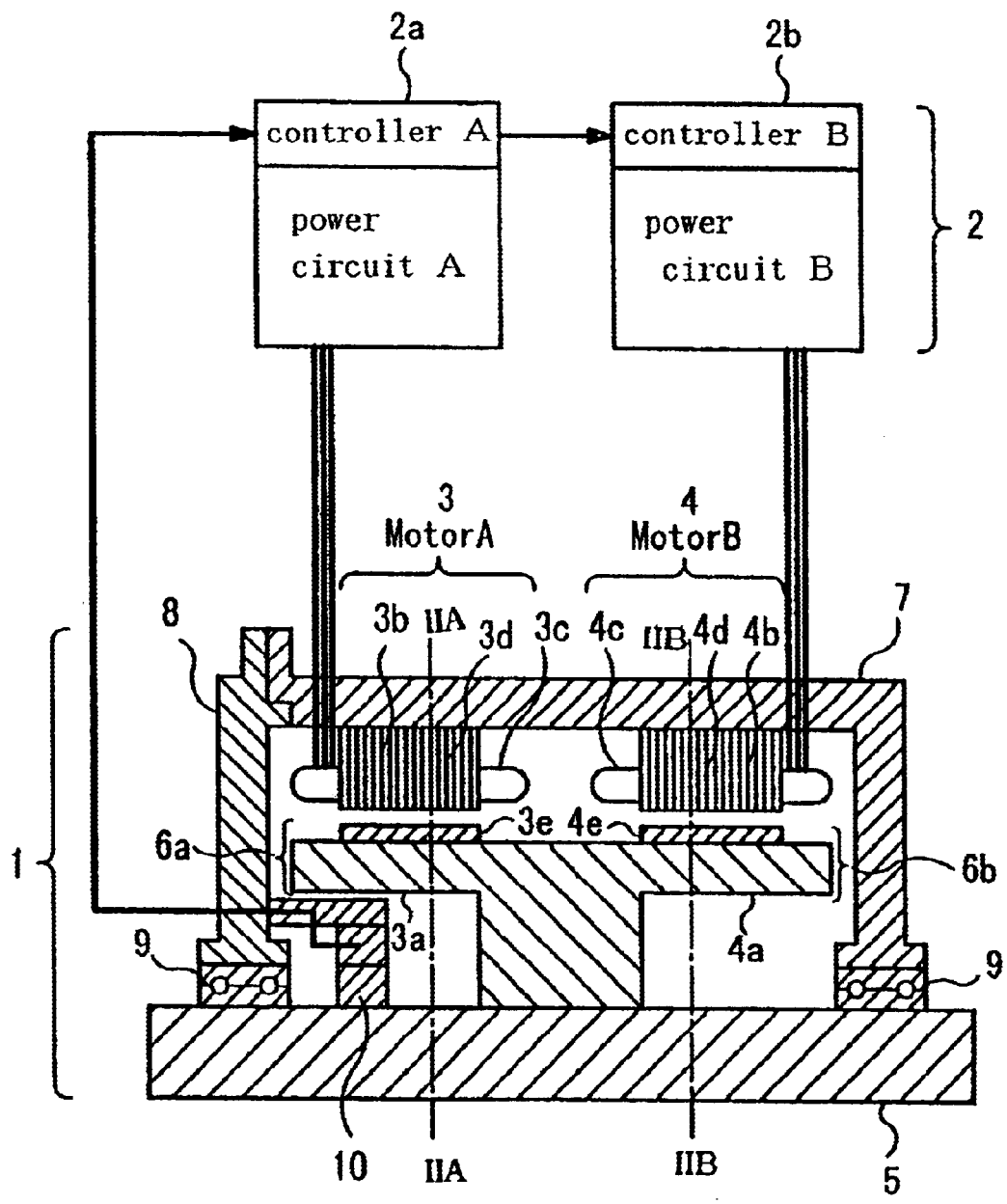
FIG. 1 is a partially sectional diagram showing the construction of a rotary electromechanical device according to a first embodiment of the invention.

FIG. 1 is a partially sectional diagram showing the construction of a rotary electromechanical device according to a first embodiment of the invention, in which designated by the numeral 1 is a rotary machine section, and designated by the numeral 2 is a driver section for driving the rotary machine section 1. Since the rotary machine section 1 is generally axially symmetric, only one side of a rotary shaft 5 is shown in FIG. 1.

The rotary machine section 1 incorporates a motor A3 and a motor B4. Rotors 6a, 6b integrally formed with yokes (iron cores) 3a, 4a are fixedly mounted on the rotary shaft 5. Permanent magnets 3e are fixed to the yoke 3a and permanent magnets 4e are fixed to the yoke 4a. A stator 3b fixed to a frame 7 and the rotor 6a together constitute the motor A3 while a stator 4b fixed to the frame 7 and the rotor 6b together constitute the motor B4. The motor A3 and the motor B4 thus constructed are arranged in series along and concentrically about the axis of the rotary shaft 5. Bearings 9 are placed between the frame 7 and the rotary shaft 5, and between a bracket 8 and the rotary shaft 5, to rotatably support the rotary shaft 5.

An encoder 10 which works as a rotational position detecting device is provided in a space formed inside the rotor 6a of the motor A3. A rotating part of the encoder 10 is fixed to the rotary shaft 5 while a stationary part of the encoder 10 is fixed to the bracket 8.

The driver section 2 for driving the rotary machine section 1 includes two variable power supplies 2a, 2b whose voltages and frequencies are variable. These variable power supplies 2a, 2b are connected to the motor A3 and the motor B4, respectively, and a power circuit A of the variable power supply 2a supplies electric currents to the motor A3 while a power circuit B of the variable power supply 2b supplies electric currents to the motor B4. Thus, the motors A3 and B4 are driven by the variable power supplies 2a and 2b, respectively, which work independent from each other. A rotational position signal output from the encoder 10 is delivered to a controller A of the variable power supply 2a and further transferred from the controller A to a controller B of the variable power supply 2b. This means that the controller A and the controller B share the same rotational position signal.

The following discussion deals with details of the motor A3 and the motor B4. The motor A3 and the motor B4 are so-called rotating-field type synchronous motors of the same construction, and their rotors 6a, 6b include the yokes 3a, 4a and the permanent magnets 3e, 4e, while their stators 3b, 4b include coils 3c, 4c and stator cores 3d, 4d, respectively.

Figure 2A:
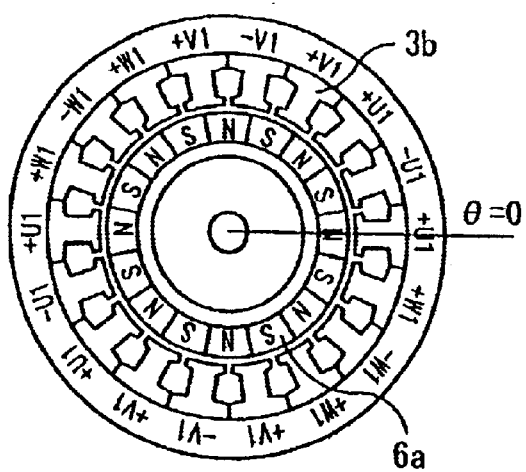
FIGS. 2A and 2B are cross-sectional views taken along lines IIA—IIA and lines IIB—IIB of FIG. 1.
Figure 2B:
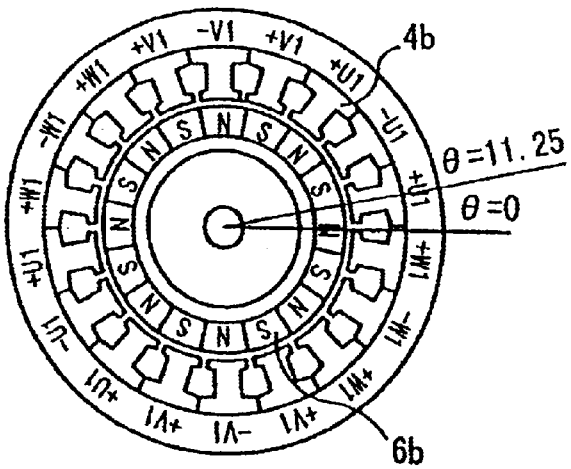
Figure 3:
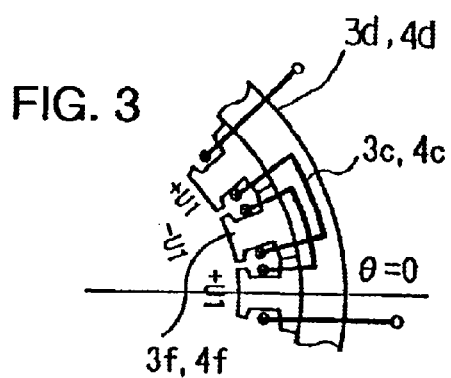
FIG. 3 is an enlarged fragmentary diagram for explaining the arrangement of coils of the first embodiment of the invention.
Figure 4:
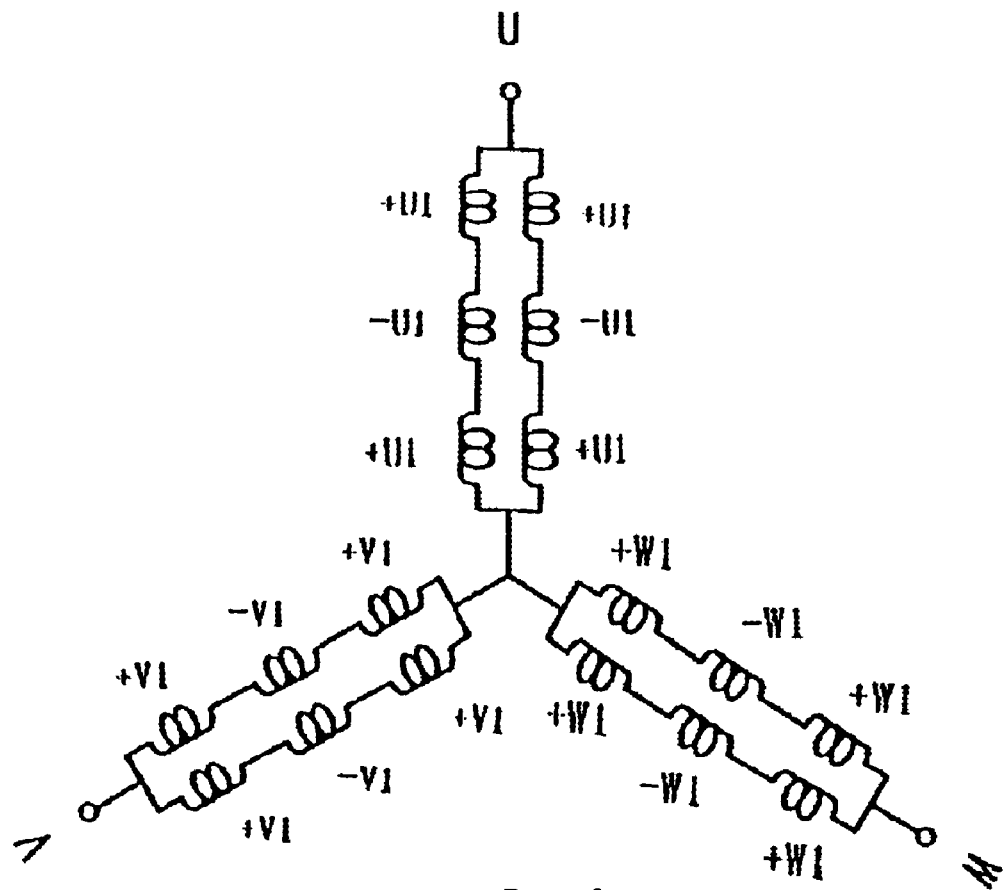
FIG. 4 is a diagram showing how the coils are connected in the first embodiment of the invention.
Figure 5:
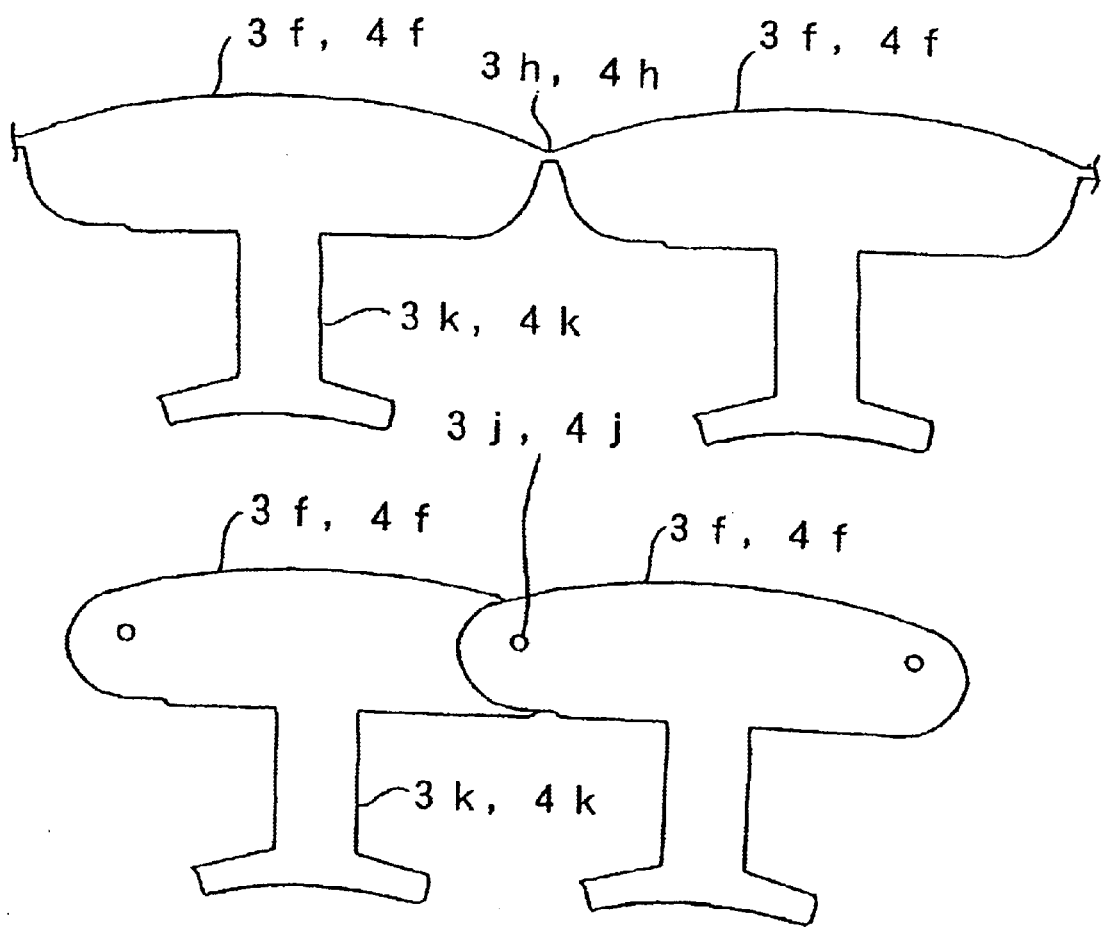
FIGS. 5A and 5B are plan views showing how teeth of stator cores of the first embodiment are connected.

FIGS. 2A and 2B are cross-sectional views taken along line IIA—IIA and line IIB—IIB of FIG. 1 (wherein the coils 3c, 4c are unillustrated), respectively, FIG. 3 is an enlarged fragmentary diagram for explaining the arrangement of the coils 3c, 4c of FIG. 1, FIG. 4 is a diagram showing connections of the coils 3c, 4c, and FIGS. 5A and 5B are plan views showing teeth 3f, 4f of the stator cores 3d, 4d. The construction of the motor A3 and the motor B4 is described below using these Figures.

In this embodiment, the permanent magnets 3e, 4e fixed to the rotors 6a, 6b form 16 poles while 18 slots are formed the stators 3b, 4b as shown in FIGS. 2A and 2B. The coils 3c, 4c arranged on the stators 3b, 4b are so-called magnetic pole concentrated winding type coils which are formed by closely winding the coils 3c, 4c around the teeth 3f, 4f, respectively, as shown in FIG. 3. The stator cores 3d, 4d are of a split segment type. Specifically, the teeth 3f, 4f formed on the stator cores 3d, 4d are originally separated from one another and are shaped into a ring form after a winding process. This split segment structure can take different forms. For example, the individual teeth 3f, 4f may be completely separated from one another. Alternatively, the separate teeth 3f, 4f may be joined one after another at their thin portions 3h, 4h as shown in FIG. 5A, or the separate teeth 3f, 4f may be connected by joints 3j, 4j as shown in FIG. 5B. These varied forms of the structure are provided with connecting parts like the thin portions 3h, 4h or the joints 3j, 4j which make it possible to increase the intervals between coil-winding portions 3k, 4k of the individual teeth 3f, 4f during the coil-winding process and to decrease the intervals so that the teeth 3f, 4f can be shaped into the ring form after the coil-winding process. As shown in FIG. 4, the coils 3c, 4c are connected to configure a three-phase star connection, in which two sets of three series-connected closely wound coils 3c, 4c of the same phase are connected in parallel.

Magnetic poles of the rotor 6a of the motor A3 and those of the rotor 6b of the motor B4 are arranged such that the magnetic poles of the same polarity are located at the same angular positions around (or at the same positions in the circumferential direction of) the rotary shaft 5, while magnetic poles (+U1) of the stator 3b of the motor A3 and their corresponding magnetic poles (+U1) of the stator 4b of the motor B4 having the same polarity with the magnetic poles (+U1) of the stator 3b are displaced from each other in the circumferential direction of the rotary shaft 5, as shown in FIGS. 2A and 2B. Given a reference position θ, for example, the middle point of a north (N) pole of the rotor 6a (6b) is located at the position of θ=0° in both the motor A3 and the motor B4. On the other hand, although the middle point of one of U-phase coils is located at the position of θ=0° in the motor A3, the middle point of the corresponding one of U-phase coils is located at the position of θ=11.25° in the motor B4. This means that the rotors 6a and 6b are mounted at the same positions relative to the rotary shaft 5, whereas the stators 3b and 4b are mounted such that their angular positions have a phase difference of 11.25° in terms of mechanical angle. Since the rotary electromechanical device of the present embodiment is a 16-pole machine, this deviation of stator mounting angles corresponds to an electrical angle of 11.25°×(16/2)=90° as will be explained later. In this arrangement of the invention, the relative distance between the poles of the same polarity on the rotors 6a, 6b and the stators 3b, 4b in the circumferential direction of the rotary shaft 5 differs between the motors A3 and B4 as stated above.

The following discussion deals with torque ripples occurring in the motors A3 and B4. It is known that torque ripples occur due to spatial harmonic components contained in a magnetic field formed by permanent magnets in a permanent magnet motor. Since induced voltages due to third harmonic magnetic fluxes are canceled out in a motor driven by a three-phase star connection as in the present invention, induced voltages occur due to fifth, seventh, eleventh, thirteenth harmonic magnetic fluxes, and so on.

While the product of the induced voltage and current gives a torque, the torque is generally expressed by equation (1) below taking into consideration the mechanical arrangement of three-phase windings:

$$T=T\_0+T\_6\cdot\cos(6\omega t+\delta\_6)+T\_12\cdot\cos(12\omega t+\delta\_12)+ \quad (1)$$

where $T\_0$ is mean torque, $\omega$ is the angular frequency of a current fed from a power supply, $T\_n$ is the amplitude of an nth torque ripple component, and $\delta\_n$ is the initial phase of an nth component of the torque ripples.

It is known that components of lower order generally have larger absolute values among the aforementioned torque ripples, and what is practically influential and problematic is a sixth component.

It is also known that when there exist dimensional errors in a stator caused by insufficient manufacturing accuracy, a 2nth component of the torque ripples generally occurs. In this case, torque T is expressed by equation (2) below, in which the value of a second component is particularly large:

$$T=T\_0+T\_2\cdot\cos(2\omega t$$
$$+\delta\_2)+T\_4\cdot\cos(4\omega t$$
$$+\delta\_4)+T\_6\cdot\cos(6\omega t$$
$$+\delta\_6)+T\_8\cdot\cos(8\omega t$$
$$+\delta\_8)+T\_10\cdot\cos(10\omega t$$
$$+\delta\_10)+T\_12\cdot\cos(12\omega t$$
$$+\delta\_12)+ \quad (2)$$

where $T\_0$ is the mean torque, $\omega$ is the angular frequency of a current fed from the power supply, $T\_n$ is the amplitude of the nth torque ripple component, and $\delta\_n$ is the initial phase of the nth component of the torque ripples.

The torque ripples occur when the components due to harmonics produced by the permanent magnets and the components produced by dimensional errors of the stator caused by insufficient manufacturing accuracy are combined as shown in the aforementioned equations (1) and (2), wherein the second and sixth components are particularly large.

Physical imbalance among coils of individual phases, eccentricity and irregularities in the inside diameter of the stator are major causes of the torque ripples related to manufacturing errors. Among them, irregularities in the inside diameter of the stator are most influential to the generation of torque ripples, particularly when a split segment type core is employed.

Figure 6:
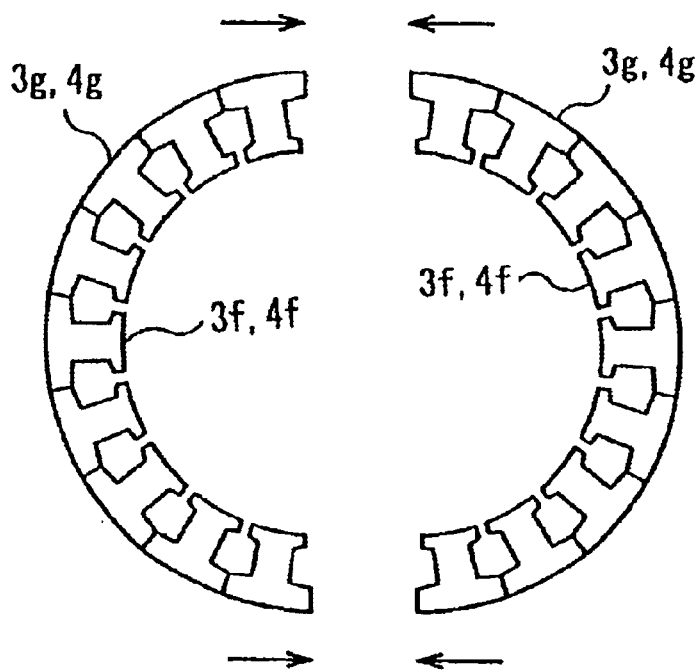
FIG. 6 is a diagram showing how a motor core of the to first embodiment is welded.
Figure 7:
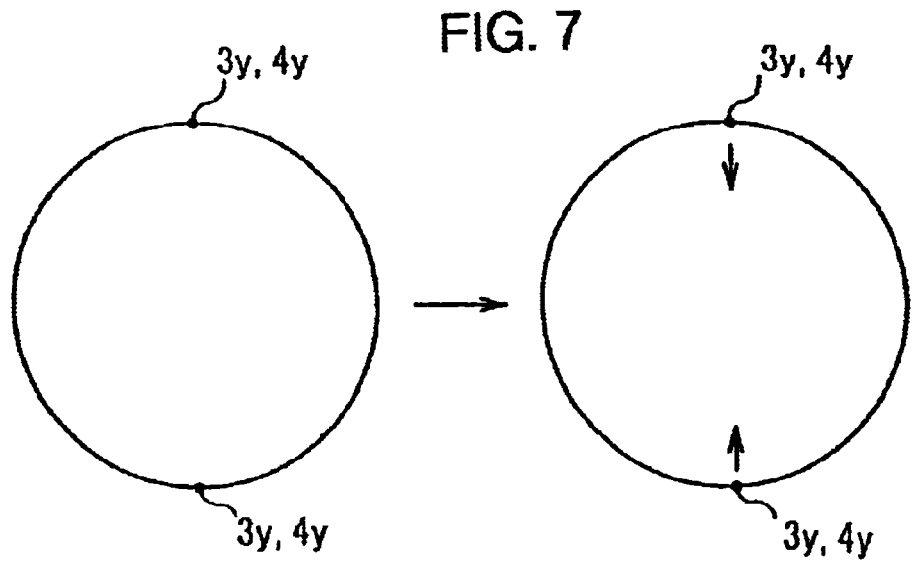
FIG. 7 is a diagram showing how irregularities in the inside diameter of a stator occur when the motor core of the first embodiment is welded.

Experiments conducted by the inventors of the present invention have proved that there is a tendency that deformation of the stator is mostly determined by welding positions and this tendency is significant particularly in the split segment type core. If two core blocks 3g (4g) each including nine teeth 3f (4f) are welded to make a core having a circular cross section as shown in FIG. 6, for example, the core would deform at two welded joints 3y (4y) in the directions of upward- and downward-pointing arrows, forming an elliptical cross-section shape, as schematically shown in FIG. 7. Therefore, if the welded joints 3y of the motor A3 and the welded joints 4y of the motor B4 are taken at the same positions, it is possible to reduce the torque ripples in a stable fashion and with good repeatability by producing the aforementioned phase difference between the motors A3 and B4.

Now, a torque ripple suppression method used when the motors A3 and B4 are driven from the independent variable power supplies 2a, 2b and controlled independently of each other is described.

It is possible to cancel out the torque ripples by inverting the phases of the second and sixth harmonics of the torque ripples of the motors A3- and B4. Since the angle for achieving phase inversion is 1/6 of the fundamental component (power supply frequency) for the sixth harmonic of the torque ripples, it may be any odd multiple of 180/6=30° (i.e., 30°, 90°, 150°, . . . ) in terms of electrical angle. Also, since the angle for achieving phase inversion is 1/2 of the fundamental component (power supply frequency) for the second harmonic of the torque ripples, it may be any odd multiple of 180/2=90° (i.e., 90°, 270°, 450°, . . . ) in terms of electrical angle. It is understood from above that both the second and sixth harmonics of the torque ripples can be canceled out with a phase difference equal to an odd multiple of the electrical angle of 90° that is common for the second and sixth harmonics.

To cancel out the torque ripples in this manner, driving currents of optimum phases are fed into the motor A3 and the motor B4. Specifically, the driving currents are fed into the motor A3 and the motor B4 with a phase difference of 90°.

As is apparent from the foregoing discussion, it is possible to suppress the torque ripples without reducing the amount of torque by displacing the positions of the magnetic poles of the stators 3b, 4b and the rotors 6a, 6b of the motor A3 including the stator 3b and the rotor 6a and the motor B4 including the stator 4b and the rotor 6b from each other in the circumferential direction of the rotary shaft 5, arranging the motor A3 and the motor B4 in series along the axial direction of the rotary shaft 5, and driving the motor A3 and the motor B4 by the variable power supplies 2a, 2b independently of each other.

Especially when the motor A3 and the motor B4 of the present embodiment are used instead of conventional concentrated winding type motors whose torque is noticeably decreased due to the torque ripple reduction method, the in aforementioned effect of suppressing the torque ripples without reducing the amount of torque would be considerably significant.

Also in the rotary electromechanical device whose motors A3 and B4 are driven by three-phase alternating current variable power supplies, it is possible to cancel out two kinds of torque ripples, that is, the torque ripples (whose frequency is six times the power supply frequency) occurring due to harmonic magnetic fluxes and the torque ripples (whose frequency is twice the power supply frequency) occurring due to dimensional errors (deformation of surfaces facing the rotors 6a, 6b) of the stators 3b, 4b caused by insufficient manufacturing accuracy, if the phase difference between the motors A3 and B4 is set to an odd multiple of 90° in terms of electrical angle.

Although the foregoing discussion of the present embodiment has dealt with a case where the torque ripples are suppressed using the relationship between the phases of the two motors without employing an skewed slot structure, it is possible to additionally adopt the skewed slot structure in the individual motors. The skew structure, if employed, could help remove the torque ripples in a more reliable fashion. Furthermore, the skew structure will serve to remove torque ripples other than those caused by the harmonic magnetic fluxes and manufacturing errors of the stators.

FIGS. 14A–14C are diagrams showing an example of the skew structure wherein permanent magnets 3e (magnetic poles) of a rotor are obliquely arranged. More particularly, FIG. 14A is a development plan view of the permanent magnets 3e of the rotor of a radial gap type in which facing surfaces of the rotor and stator are arranged parallel to the axial direction of a rotary shaft, and FIG. 14B is a plan view showing permanent magnets of the rotor of a later-described axial gap type. Referring to FIG. 14A, the permanent magnets 3e are arranged obliquely to an arrow showing the axial direction of the rotary shaft. When the permanent magnets 3e are mounted obliquely to the axial direction in this fashion, the phase of magnetic fluxes intersecting the stator deviates toward the axial direction and, as a consequence, it is possible to cancel out the torque ripples.

A skew angle is the degree of obliquity with respect to the axial direction and is defined as the electrical angle 360×a/b (degree) using variables "a" (the amount of deviation of a lower end of the permanent magnets 3e from the axial direction) and "b" (the overall width of two adjacent south (S) and north (N) magnetic poles) shown in FIG. 14A. The following effects can be obtained by properly adjusting this skew angle.

If, for example, the skew angle is set to an electrical angle of 180°, it is possible to cancel out components whose frequency is six times the power supply frequency as well as components whose frequency is twice the power supply frequency, and by employing two independent motors and displacing the phases, it becomes possible to suppress the torque ripples in a more reliable fashion.

Even when the skew angle is set to an electrical angle of other than 180°, it is possible to cancel out other components than the aforementioned components which occur in relation to the power supply frequency, should such components occur. For example, the same number of torque ripples as the number of slots per revolution (18 torque ripples per revolution in the present embodiment) could occur due to manufacturing errors of the rotors (e.g., deviation of field pole positions). Should this occur, the 18 torque ripples per revolution can be suppressed if the skew angle is set to 160° in terms of electrical angle.

In the case of the axial gap type shown in FIG. 14B, the permanent magnets 3e should be set at an oblique angle to the radial direction of the rotary shaft compared to a non-skew structure. This angle of deviation of the permanent magnets 3e is the skew angle, and the same effects as would be achieved with the radial gap type of FIG. 14A are obtained by adjusting the skew angle.

In addition, the same effects as would be achieved with the skew structure of FIG. 14A, in which the permanent magnets 3e are obliquely arranged, are obtained in a skew structure of FIG. 14C, in which the permanent magnets 3e are arranged in two layers and the permanent magnets 3e in one layer are horizontally displaced from the permanent magnets 3e in the other layer.

Figure 8:
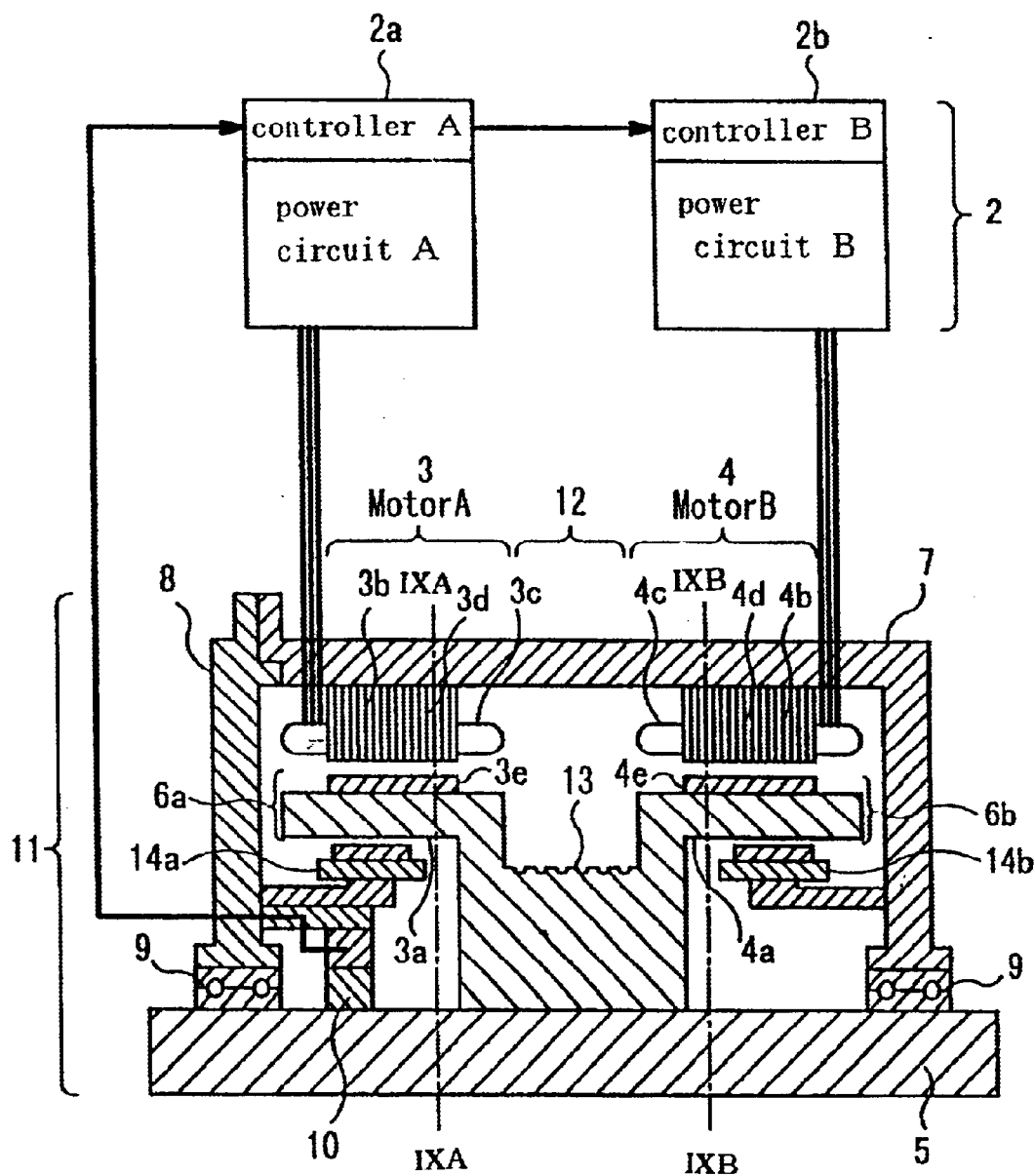
FIG. 8 is a partially sectional diagram showing the construction of a pulley driving system according to a second embodiment of the invention.

While FIGS. 14A–14C show examples of skew structures in which the magnetic poles of the rotors are obliquely arranged, the magnetic poles of the stators may be arranged obliquely, or the magnetic poles of both the rotors and the stators may be arranged obliquely in opposite directions Second Embodiment FIG. 8 is a partially sectional diagram showing the construction of a built-in motor type pulley driving system according to a second embodiment of the invention employing the rotary electromechanical device of the above-described first embodiment. In FIG. 8, the same reference numerals as used in the first embodiment indicate elements identical or equivalent to those of the first embodiment, and a detailed description of such elements is omitted.

As illustrated in FIG. 8, a hoisting machine 11 includes a pulley section 12 provided at the center, a motor A3 and a motor B4 provided respectively on the left and right of the pulley section 12, wherein yokes (iron cores) 3a, 4a of rotors 6a, 6b of the motor A3 and the motor B4 and a pulley 13 of the pulley section 12 form a single structure which is fixedly mounted on a rotary shaft 5. This means that the motor A3 and the motor B4 are integrally mounted on a common axis on the rotary shaft 5 with the pulley 13 disposed in between.

Brakes 14a, 14b are provided in internal spaces of the rotors 6a, 6b of the motor A3 and the motor B4 and fixed to a frame 7 or to a bracket 8.

As is the case with the first embodiment, a driver section 2 for driving the hoisting machine 11 includes two variable power supplies 2a, 2b which are connected to the the motor A3 and the motor B4, respectively. Thus, the motor A3 and the motor B4 are driven by the respective variable power supplies 2a, 2b independently of each other.

Since the pulley driving system of this embodiment employs the same rotary electromechanical device of the first embodiment, it is possible to suppress torque ripples and prevent a reduction in the amount of torque produced by the hoisting machine 11.

Furthermore, there is no need to unnecessarily increase the mechanical strength of connecting parts between the pulley section 12 and motor sections and the physical size of the system can be reduced. This is because the pulley section 12 which carries loads is located between the motor A3 and the motor B4 and the two motors A3, B4 are symmetrically arranged so that the loads exerted on the pulley section 12 are well balanced and forces applied to the pulley section 12 and the motors A3, B4 can be properly distributed.

Figure 9A:
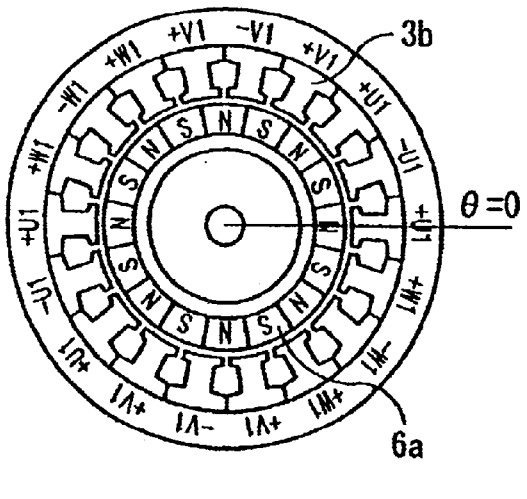
FIGS. 9A and 9B are cross-sectional views similar to FIGS. 2A and 2B showing an alternative arrangement of stators and rotors of the first and second embodiments.
Figure 9B:
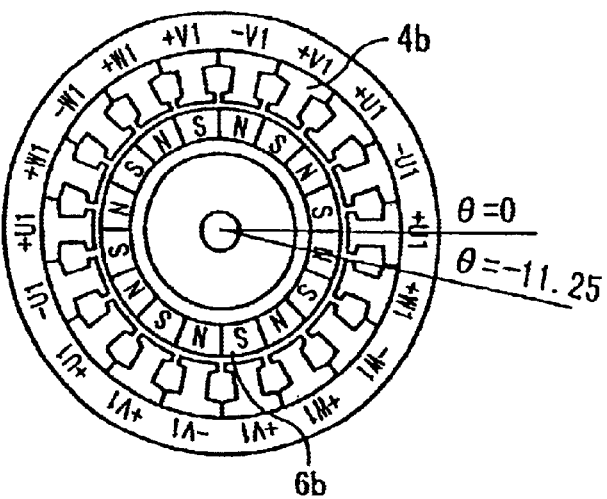

While the foregoing first and second embodiments show examples in which the magnetic poles of the rotors 6a, 6b are mounted such that the magnetic poles of the same polarity are located at the same positions in the circumferential direction of the rotary shaft 5 while the magnetic poles of the stators 3b, 4b are mounted such that the magnetic poles of the same polarity are displaced by 90° in terms of electrical angle in the circumferential direction of the rotary shaft 5 as depicted in FIGS. 2A and 2B, the invention is not limited to this arrangement as long as the torque ripple can be canceled out. Shown in FIGS. 9(A) and 9(B) are examples of an alternative arrangement, in which FIG. 9(A) is a cross-sectional view taken along line IXA—IXA of FIG. 8 and FIG. 9(B) is a cross-sectional view taken along line IXB—IXB of FIG. 8. In this alternative arrangement, the corresponding magnetic poles of the stators 3b, 4b are mounted such that they are located at the same angular positions around the rotary shaft 5 while the magnetic poles of the rotors 6a, 6b are mounted such that the magnetic poles of the same polarity are displaced by 90° in terms of electrical angle in the circumferential direction of the rotary shaft 5 as illustrated in FIGS. 9A and 9B.

Although the foregoing discussion has presented examples in which the number of the magnetic poles on each of the rotors 6a, 6b is 16 and the number of the magnetic poles on each of the stators 3b, 4b is 18, the invention is not limited thereto.

Also, while the foregoing discussion has dealt with a case where the rotary electromechanical device includes two motors A3, B4, there may be provided three or more motors. In the latter case, the relative distance between the magnetic poles of the same polarity on the rotors and the motors should be varied among the individual motors as is the case with the foregoing arrangements provided with two motors.

Furthermore, the foregoing arrangements utilize the encoder 10 as the rotational position detecting device, the invention is not limited thereto. As an alternative, a resolver may be employed as the rotational position detecting device, for example.

Furthermore, the rotational position signal output from the encoder 10 may be shared as a sensor signal and subjected to a signal processing operation in both controllers A and B. Alternatively, a master-slave configuration may be employed, in which the rotational position signal is subjected to the signal processing operation in one controller only (master) and the other controller (slave) receives switching timing information from the master controller.

Third Embodiment

Figure 10:
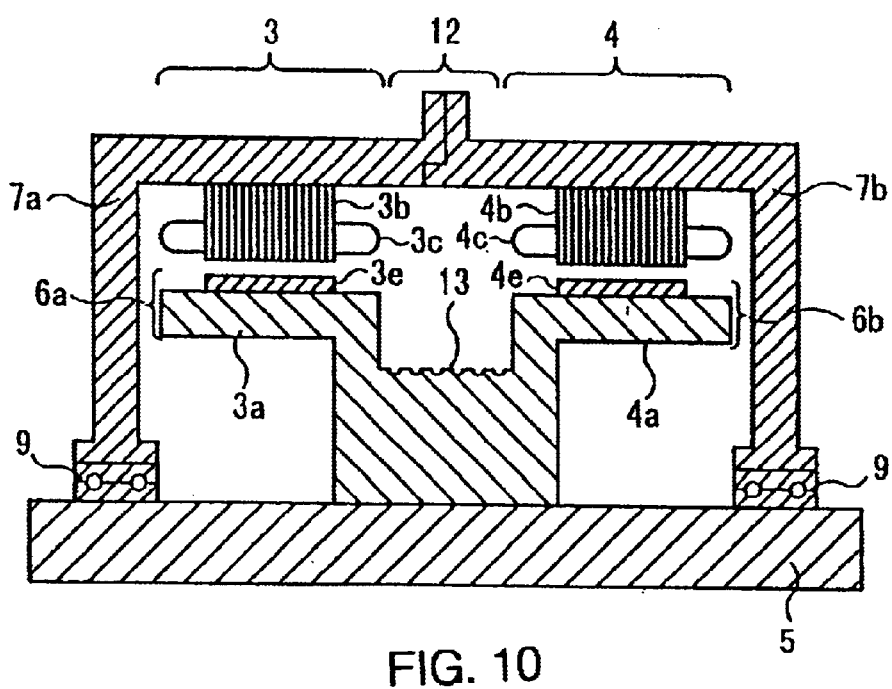
FIG. 10 is a sectional diagram showing a construction according to a third embodiment of the invention.

FIG. 10 is a sectional diagram showing a construction according to a third embodiment of the invention, in which the same reference numerals as used in FIG. 8 indicate elements identical or equivalent to those shown in the foregoing discussion.

In this embodiment, a frame is divided at its center into two parts, a first frame section 7a and a second frame section 7b. This construction makes it possible to configure stators 3b, 4b of motors A3 and B4 by shrink-fitting the first frame section 7a on the stator 3b and the second frame section 7b on the stator 4b and, then, assembling the first and second frame sections 7a, 7b. Since the stators 3b and 4b can be assembled independently of each other by shrink fit process which requires considrably high positioning accuracy during manufacture, this embodiment helps improve productivity.

Figure 11:
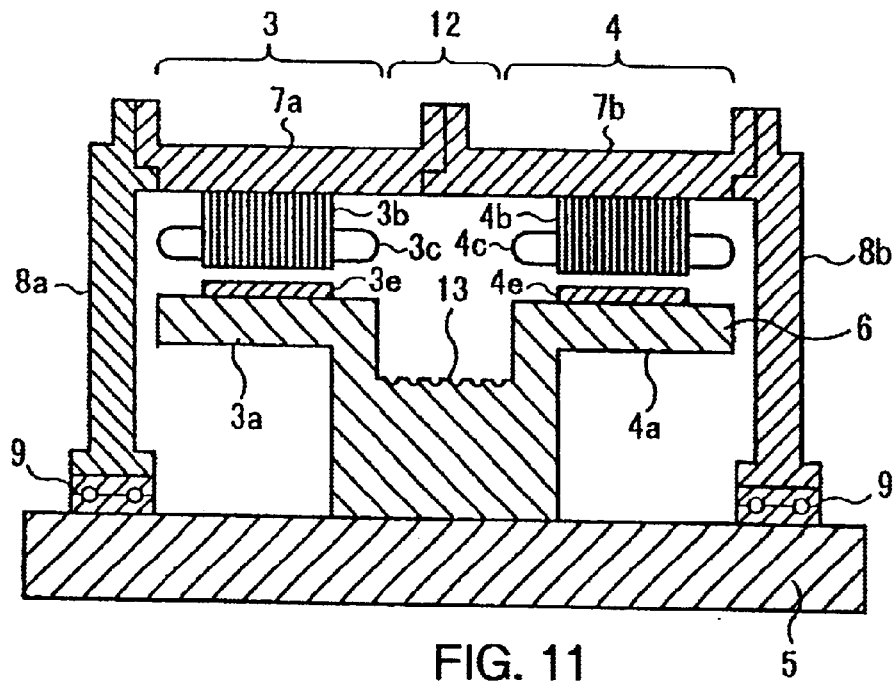
FIG. 11 is a sectional diagram showing a construction in one varied form of the third embodiment of the invention.

As an alternative, the frame may be divided into four discrete parts, that is, first and second frame sections 7a, 7b and brackets 8a, 8b as shown in FIG. 11. This alternative also enables assembly of the stators 3b and 4b by shrink fitting independently of each other, as in the case of FIG. 10. By dividing the frame into the first and second frame sections 7a, 7b and brackets 8a, 8b, it becomes easier to access the internal spaces of rotors 6, resulting in an increase in ease of assembly of such components as an encoder.

Fourth Embodiment

Figure 12:
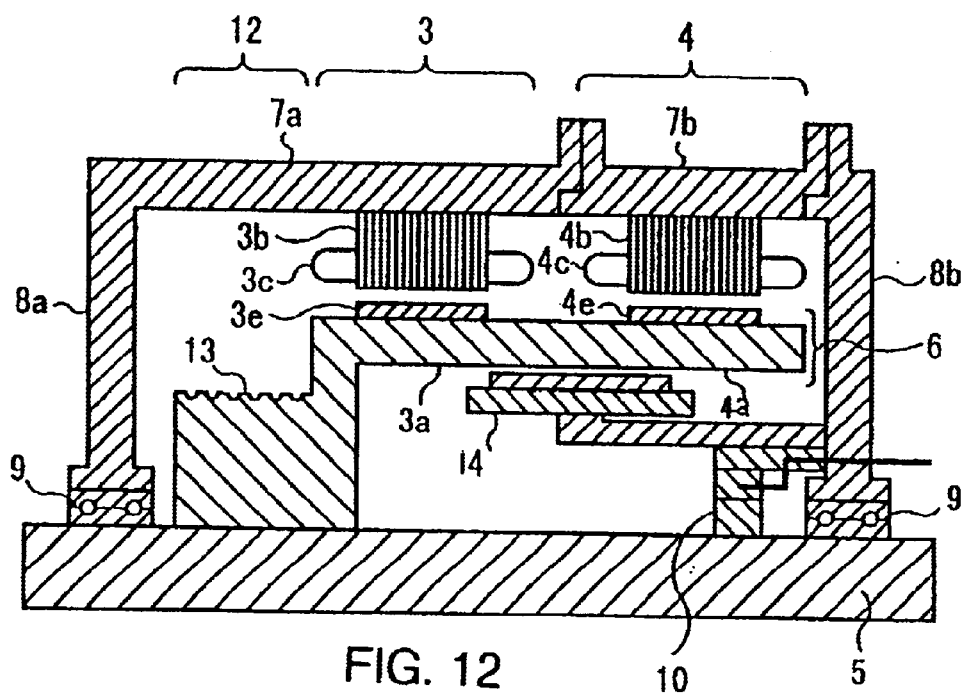
FIG. 12 is a sectional diagram showing a construction according to a fourth embodiment of the invention.

FIG. 12 is a sectional diagram showing a construction according to a fourth embodiment of the invention, in which the same reference numerals as used in FIG. 8 indicate elements identical or equivalent to those shown in the foregoing discussion.

The construction of this embodiment is characterized in that both motors A3 and B4 are provided on one side of a pulley section 12 and a frame 7 and a bracket 8 are of a three-segment structure. This construction provides the following advantageous effects:

(1) Since the distance between the motors A3 and B4 is reduced, a structural part between the motors A3 and B4 has greater torsional rigidity and a control response delay caused by torsional deformation is eliminated. As a result, it becomes possible to cancel out torque ripples regardless of the amount of load torque.

(2) Since this construction enables assembly from one side, it helps improve productivity.

(3) As is the case with the third embodiment described above, it is possible to configure stators 3b, 4b by shrink-fitting a first frame section 7a on the stator 3b and a second frame section 7b on the stator 4b and, then, assembling the first and second frame sections 7a, 7b. Since the stators 3b and 4b are assembled independently of each other by the shrink fit process which requires highly accurate positioning during manufacture, this embodiment helps improve productivity.

(4) Since larger internal spaces are made available in rotors 6, this construction helps increase the degree of freedom in designing equipment disposed in the internal spaces.

If magnetic poles of the stator 3b and the stator 4b are displaced from each other in the circumferential direction of the a rotary shaft 5 and magnetic poles of the same polarity of the two rotors 6 are located at the same angular positions around the rotary shaft 5 as illustrated in FIGS. 2A and 2B, it is possible to perform a process of positioning permanent magnets 3e, 4e in the circumferential direction when installing the rotors 6 simultaneously on the two motors A3, 34. This serves to further improve productivity.

Fifth Embodiment

Figure 13:
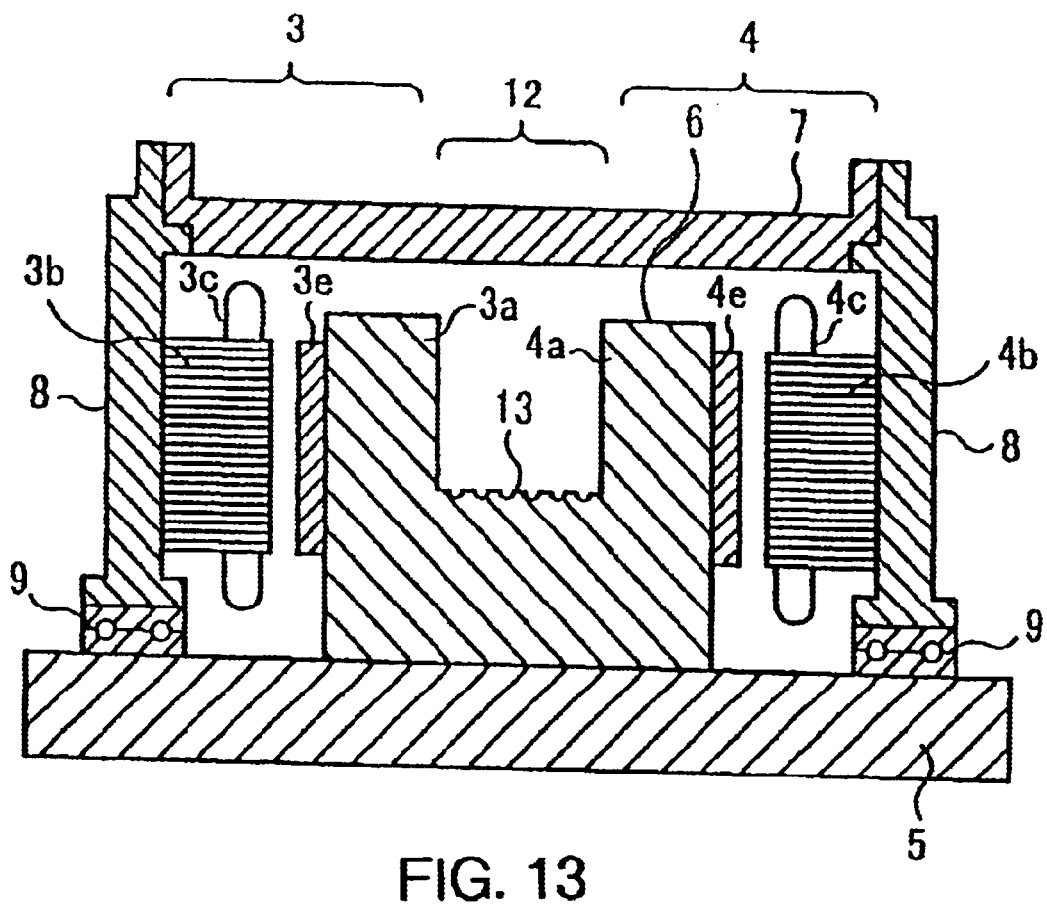
FIG. 13 is a sectional diagram showing a construction according to a fifth embodiment of the invention.

FIG. 13 is a sectional diagram showing a construction according to a fifth embodiment of the invention, in which the same reference numerals as used in FIG. 8 indicate elements identical or equivalent to those shown in the foregoing discussion.

Motors A3 and B4 of this embodiment are so-called axial flux type motors, in which facing surfaces of stators 3b, 4b and rotors 6 are vertical side surfaces (flat surfaces), and not cylindrical surfaces. Although it is necessary to increase the strength of a support mechanism for maintaining the width of an air gap between the facing surfaces of the stators 3b, 4b and the rotors 6 to withstand electromagnetic forces exerted on the facing surfaces in this construction, it is possible to obtain a greater mechanical accuracy with the flat surfaces compared to the cylindrical surfaces, so that torque ripples occurring in relation to surface irregularities can be suppressed.

What is claimed is:

1. A pulley driving system comprising:
    a rotary shaft having an axial direction;
    a plurality of motor sections, each motor section including a rotor and a stator facing each other, the rotors of the individual motor sections being fixedly mounted in series on the rotary shaft;
    a pulley section arranged in series with the rotors in the axial direction of the rotary shaft and fixedly mounted on the rotary shaft, the pulley section having a smaller outside diameter than the motor sections; and
    power supplies for driving the multiple motor sections independently of one another, wherein
        at least one of groups of the stators and groups of the rotors have cores, each core being divided into multiple core blocks, the blocks being arranged along a circumferential direction of the rotary shaft and welded into a single structure, welded joints of the cores of the individual motor sections being located at the same angular positions with respect to magnetic poles of common polarity, and
        relative angles of the magnetic poles of common polarity on the rotor and the stator of the individual motor sections, along the circumferential direction of the rotary shaft, differs for respective individual motor sections.

2. The pulley driving system according to claim 1, wherein
    the multiple motor sections include two motor sections driven by respective power supplies, the respective power supplies supplying a three-phase alternating current, and
    the difference between the relative angles between the motor sections corresponds to a phase difference equal to an odd integer multiple of 90°, in terms of electrical angle.

3. The pulley driving system according to claim 1, wherein the stators have a magnetic pole concentrated winding in which coils are wound around individual teeth on stator cores of the individual stators of the motor sections.

4. The pulley driving system according to claim 1, wherein the motor sections have a radial gap in which facing surfaces of the stators and the rotors are parallel to the axial direction of the rotary shaft.

5. The pulley driving system according to claim 1, wherein the motor sections have an axial gap in which facing surfaces of the stators and the rotors are at right angles to the axial direction of the rotary shaft.

6. The pulley driving system according to claim 1, including iron cores in the individual rotors and wherein the pulley section and the iron cores are a single structure.

7. The pulley driving system according to claim 1, wherein all of the multiple motor sections are located on one side of the pulley section in the axial direction of the rotary shaft.

8. The pulley driving system according to claim 1; wherein the multiple motor sections include two motor sections located symmetrically on opposite sides of the pulley section in the axial direction of the rotary shaft.

9. The pulley driving system according to claim 1 further comprising a brake located in an internal space of the rotors for braking the rotary shaft.

10. The pulley driving system according to claim 1, wherein the stators include coils located in an area excluding a space immediately around an outer peripheral surface of the pulley section.

11. The pulley driving system according to claim 1, wherein the multiple motor sections include first and second motor sections, and the pulley driving system further comprises:
    a casing in which the pulley section, the first motor section, and the second motor section are arranged along the rotary shaft from a first end of the rotary shaft, and the casing includes
    first and second brackets respectively located at opposite ends of the casing and supporting opposite ends of the rotary shaft via bearings, and
    a cylindrical frame interconnecting outer peripheral portions of the first and second brackets, wherein the casing is a three-part structure comprising a first one-piece casing portion including the first bracket, facing the pulley section, and a first frame section shrink-fitted on the stator of the first motor section, a second casing portion including a second frame section shrink-fitted on the stator of the second motor section, and a third casing portion including the second bracket, facing the second motor section.

* * * * *